US010686192B2

(12) United States Patent
Kim et al.

(10) Patent No.: US 10,686,192 B2
(45) Date of Patent: Jun. 16, 2020

(54) CURRENT COLLECTOR FOR SECONDARY BATTERY AND ELECTRODE USING SAME

(71) Applicant: JENAX INC., Busan (KR)

(72) Inventors: Chang Hyeon Kim, Chungcheongnam-do (KR); Min Gyu Choi, Sejong (KR); Lee Hyun Shin, Busan (KR)

(73) Assignee: Jenax, Inc., Busan (KR)

( * ) Notice: Subject to any disclaimer, the term of this patent is extended or adjusted under 35 U.S.C. 154(b) by 0 days.

(21) Appl. No.: 14/392,220

(22) PCT Filed: Jun. 24, 2014

(86) PCT No.: PCT/KR2014/005602
§ 371 (c)(1),
(2) Date: Dec. 24, 2015

(87) PCT Pub. No.: WO2014/208996
PCT Pub. Date: Dec. 31, 2014

(65) Prior Publication Data
US 2016/0190599 A1 Jun. 30, 2016

(30) Foreign Application Priority Data
Jun. 24, 2013 (KR) .................. 10-2013-0072358

(51) Int. Cl.
*H01M 4/66* (2006.01)
*H01M 4/13* (2010.01)
(Continued)

(52) U.S. Cl.
CPC ............. *H01M 4/667* (2013.01); *H01M 4/13* (2013.01); *H01M 4/661* (2013.01); *H01M 4/666* (2013.01);
(Continued)

(58) Field of Classification Search
CPC ........ H01M 4/665; H01M 4/66; H01M 4/667; H01M 4/668
See application file for complete search history.

(56) References Cited

U.S. PATENT DOCUMENTS

2008/0063942 A1* 3/2008 Okuno .................. H01M 4/667
429/232
2010/0035141 A1* 2/2010 Grosvenor ........ H01M 10/0525
429/129

(Continued)

FOREIGN PATENT DOCUMENTS

EP 0264771 * 4/1988 ............... D04H 1/58
JP 2009-181905 8/2009

(Continued)

OTHER PUBLICATIONS

International Search Report dated Sep. 30, 2014 for PCT/KR2014/005602.

(Continued)

*Primary Examiner* — Jeremiah R Smith
(74) *Attorney, Agent, or Firm* — Jones Day

(57) ABSTRACT

The present invention relates to a battery technology, and more particularly, to a current collector that may be widely used in secondary batteries and an electrode employing the same. The current collector according to an embodiment of the present invention includes a conductive substrate; and a conductive fiber layer, which is dispersed on the conductive substrate and comprises pores. The conductive fiber layer comprises a plurality of metal filaments and liner binders mixed with the plurality of metal filaments, and the conductive fiber layer is combined with the conductive substrate via the mixed linear binders.

11 Claims, 2 Drawing Sheets

(51) Int. Cl.
*H01M 4/72* (2006.01)
*H01M 4/75* (2006.01)
*H01M 10/0525* (2010.01)

(52) U.S. Cl.
CPC ............... *H01M 4/72* (2013.01); *H01M 4/75* (2013.01); *H01M 10/0525* (2013.01); *H01M 4/663* (2013.01); *H01M 4/665* (2013.01); *H01M 4/668* (2013.01); *H01M 2220/20* (2013.01); *H01M 2220/30* (2013.01); *Y02T 10/7011* (2013.01)

(56) References Cited

U.S. PATENT DOCUMENTS

| | | | | |
|---|---|---|---|---|
| 2011/0136010 | A1* | 6/2011 | Muraoka | H01M 4/13 429/217 |
| 2012/0040246 | A1* | 2/2012 | Sakai | H01M 4/131 429/217 |
| 2013/0157128 | A1 | 6/2013 | Solan et al. | |
| 2013/0202960 | A1* | 8/2013 | Kim | H01M 4/02 429/209 |
| 2013/0323602 | A1* | 12/2013 | Matsunaga | B22F 7/04 429/236 |

FOREIGN PATENT DOCUMENTS

| | | | | |
|---|---|---|---|---|
| JP | 2012-219333 | * | 11/2012 | H01M 4/80 |
| KR | 10-1088073 | | 12/2011 | |
| KR | 10-2012-0114117 | | 10/2012 | |

OTHER PUBLICATIONS

Written Opinion of the International Search Report dated Sep. 30, 2014 for PCT/KR2014/005602.

* cited by examiner ized and are physically combined with one another by being bent or tangled, and thus pores in the conductive fiber layer may be
CURRENT COLLECTOR FOR SECONDARY BATTERY AND ELECTRODE USING SAME This application claims the priority of Korean Patent Application No. 10-2013-0072358, filed on Jun. 24, 2013 in the KIPO (Korean Intellectual Property Office), the disclosure of which is incorporated herein entirely by reference. Further, this application is the National Stage application of International Application No. PCT/KR2014/005602, filed Jun. 24, 2014, which designates the United States and was published in Korean. Each of these applications is hereby incorporated by reference in their entirety into the present application.

TECHNICAL FIELD

The present invention relates to a battery technology, and more particularly, to a current collector that may be widely used in secondary batteries and an electrode using the same.

BACKGROUND ART

Along with growth of industries related to portable electronic devices associated with developments of semiconductor fabricating technologies and communication technologies and increasing demand for development of an alternative energy based on environmental conservation and resource exhaustion, battery-related techniques are being actively researched. Particularly, secondary batteries that can be recharged and repeatedly used are being researched. Fields of applications of secondary batteries are expanding from batteries for small devices, such as mobile phones, laptop PCs, and mobile display devices, to mid-sized and large-sized batteries including batteries for electric vehicles and batteries applied to hybrid vehicles. Basically demanded features of such a battery include small weight, small volume, high energy density, excellent charging/discharging speeds, excellent charging/discharging efficiencies, excellent cycle characteristics, high stability, and high economic feasibility.

DISCLOSURE OF THE INVENTION

Technical Problem

The present invention provides a current collector for reducing internal resistance between the current collector and an electrically active material layer, thereby improving charging/discharging efficiencies, charging/discharging speed, cycle characteristics, and life expectancy of a battery.

The present invention also provides an electrode employing a current collector having the above-stated advantages.

Technical Solution

According to an aspect of the present invention, there is provided a current collector including a conductive substrate; and a conductive fiber layer, which is dispersed on the conductive substrate and includes pores, wherein the conductive fiber layer includes a plurality of metal filaments and liner binders mixed with the plurality of metal filaments, and the conductive fiber layer is combined with the conductive substrate via the mixed linear binders.

According to some embodiments, an average length of the metal filaments may be within a range from about 10 mm to about 150 mm, and preferably, may be from about 35 mm to about 120 mm to be easily mixed with the linear binders and to from a non-woven fabric. An average thickness of the plurality of metal filaments may be within a range from about 0.1 μm to about 50 μm, and preferably, may be from about 2 μm to about 20 μm. The plurality of metal filaments may include a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof.

The linear binders may include polyethylene (PE), polypropylene (FP), polyethylene terephthalate (PET), polypropylene terephthalate (PPT), polyacrylonitryl (PAN), nylon, polyethylene naphthalatc (PEN), polyether sulfone (PES), polyether etherketone (PEEK), polyphenylene sulfide (PPS), polyvinyliden fluoride (PVDF), a copolymer thereof, a derivative thereof, or a mixture thereof. Other polymer materials advantageous for fiberization may be used as linear binders.

The conductive fiber layer may have a non-woven fabric structure. Furthermore, the conductive substrate may include a metal foil, a metal mesh, or a stacked structure thereof. According to another embodiment of the present invention, the conductive substrate may include a stacked structure including a flexible insulation resin and a metal thin-film stacked on the flexible insulation resin. The conductive fiber layer may be thermally fused onto the conductive substrate.

According to another aspect of the present invention, there is provided an electrode including the above-stated current collector and an electrically active material that is impregnated into the conductive fiber layer or coated onto the plurality of metal filaments. The electrode may be for lithium-ion battery.

Advantageous Effects

According to an embodiment of the present invention, a current collector having a three-dimensional network structure may be obtained based on a current collector including a conductive fiber layer. A plurality of metal filaments constituting the conductive fiber layer are individualized and are physically combined with one another by being bent or tangled, and thus pores in the conductive fiber layer may be easily changed. Therefore, it is easy to impregnate an electrically active material into a current collector, and the metal filaments are introduced into an electrically active material layer, thereby reducing internal resistance of an electrode. Furthermore, linear binders that are fused to the metal filaments and combines the metal filaments to one another absorbs stresses based on change of volume of the electrically active material due to charging/discharging of a battery and maintains structure of the conductive fiber layer, thereby preventing reduction of irreversible capacity and life expectancy due to detachment of the electrically active material from the metal filaments.

According to another embodiment of the present invention, since the conductive fiber layer may be fabricated in fabric operations known in the art, operations for fabricating the conductive fiber layer may be easily performed. Furthermore, since the conductive fiber layer has flexibility, a battery that may be packaged in various forms may be obtained.

MODE FOR CARRYING OUT THE INVENTION

Figure 1A:
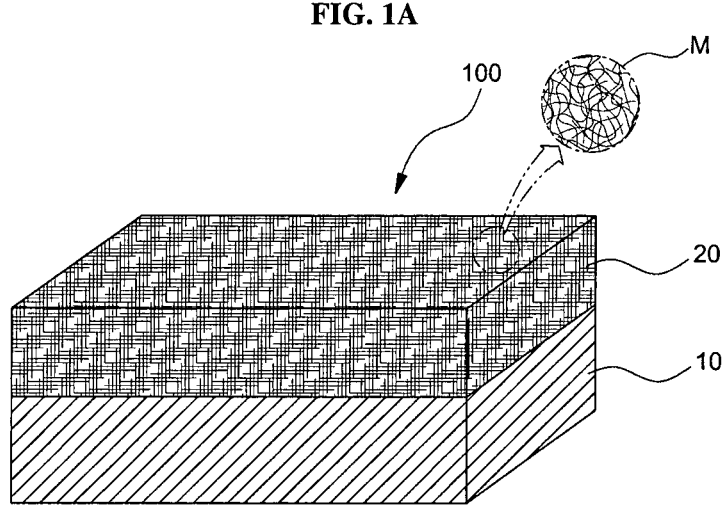
FIG. 1A is a perspective view of a current collector according to an embodiment of the present invention.

Hereinafter, exemplary embodiments will be described in detail with reference to accompanying drawings.

The invention may, however, be embodied in many different forms and should not be construed as being limited to the embodiments set forth herein; rather, these embodiments are provided so that this disclosure will be thorough and complete, and will fully convey the concept of the invention to those skilled in the art.

Furthermore, in the drawings, the thicknesses of layers and regions are exaggerated for clarity, and like reference numerals in the drawings denote like elements. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more can features, integers, steps, operations, elements, components, and/or groups thereof.

Although numerical terms (e.g., "first" and "second") are used herein to describe various members, parts, regions, layers and/or sections, these members, parts, regions, layers and/or sections are not to be limited by these terms. These terms are only used to distinguish one member, part, region, layer or section from another member, part, region, layer or section. Thus, for example, a first member, part, region, layer or section discussed below could be termed a second, part, region, layer or section without departing from the teachings of the illustrated embodiments.

Furthermore, metal filaments disclosed in the present specification are fabricated by fiberizing a metal and refers to metal fibers having an average diameter from about 0.1 μm to about 50 μm (preferably, from about 2 μm to about 20 μm) and an average length from about 10 mm to about 150 mm (preferably, from about 35 mm to about 120 mm), for example. Within the above-stated ranges of dimensions, the metal filament feature properties of metals, that is, heat-resistance, plasticity, and electric conductivity and also feature flexibility and mechanical advantages unique to fibers for fabricating a weaved fabric and a non-woven fabric.

The metal filaments may be fabricated by maintaining a metal or an alloy in a suitable container in the form of a molten liquid and rapidly solidifying the molten liquid by jetting the molten liquid into the air via discharge holes of the container by using a compressed gas or a pressing device, such as a piston. Alternatively, metal filaments may be fabricated by using a bundle drawing method known in the art. By controlling a number and size of the discharge holes and/or scattering of discharged molten metal, thickness, uniformity, tissue like non-woven fabric, and aspect ratio of metal filaments may be controlled.

Metal filaments according to the present invention may include not only metal filaments fabricated by using the above-stated fabrication methods, but also metal filaments fabricated by using other methods known in the art, whew the present invention is not limited thereto. The metal filament according to the present invention feature properties of metals, that is, heat-resistance, plasticity, and electric conductivity and also feature flexibility and mechanical advantages unique to fibers for fabricating a weaved fabric and a non-woven fabric. The present invention relates to characteristics and advantages in case of applying the above-stated advantages of metal filaments to a current collector of a battery.

Figure 1B:
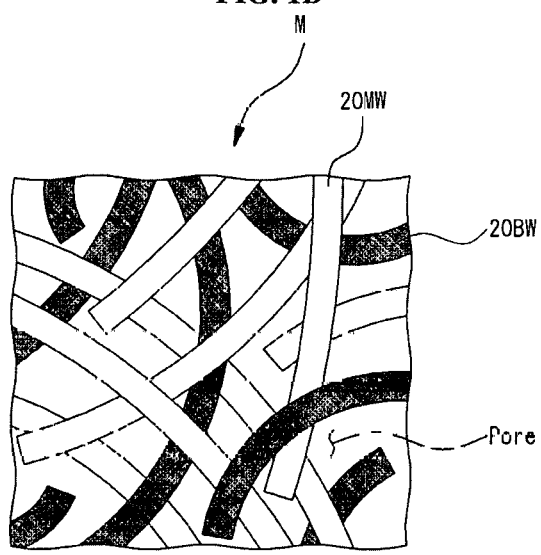
FIG. 1B is a partially magnified view of a region M of FIG. 1A.

FIG. 1A is a perspective view of a current collector 100 according to an embodiment of the present invention, and FIG. 1B is a partially magnified view of a region M of FIG. 1A.

Referring to FIG. 1A, the current collector 100 includes a conductive substrate 10 and a conductive fiber layer 20. The conductive substrate 10 may be a metal foil. According to another embodiment of the present invention, the conductive substrate 10 may be a metal mesh or a structure having stacked therein a metal foil and a metal mesh. The conductive substrate 10 may include a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof. For example, in case of a current collector for an anode electrode, the conductive substrate 10 may be a copper foil. In case of a current collector for a cathode electrode, the conductive substrate 10 may be an aluminum foil.

Referring to FIGS. 1A and 1B, the conductive fiber layer 20 is a conductive network layer including one-dimensional linear metal filaments 20MW and linear binders 20BW as a skeleton structure. The metal filaments 20MW physically contact one another and some of the metal filaments 20MW physically contact the conductive substrate 10, and thus conductive paths may be provided not only throughout the conductive network, but also between the conductive network layer and the conductive substrate 10. The metal filaments 20MW and the conductive substrate 10 may be adhered to each other as some or the entire linear binders 20BW dispersed in the conductive fiber layer 20 are vitrified or partially melted and fused therebetween. Detailed descriptions thereof will be given below with reference to FIG. 3.

The metal filaments 20MW and the linear binders 20BW may form a non-woven fabric structure by being randomly tangled with each other. In terms of fabrication, the metal filaments 20MW may be randomly mixed with the linear binders 20BW, and then, based on fibrous characteristics thereof, a three-dimensional porous fiber structure may be formed in a bridging operation or another fiber blending operation. In this regard, since metal filaments having one-dimensional linear structures are individualized from one another, the metal filaments 20MW may be distinguished from a metal mesh or metal foam in which fibers are chemically bonded or integrated with one another to not to be separated from one another. Therefore, unlike the metal mesh or the metal foam, the conductive fiber layer 20 exhibits improved structural flexibility and enables easy impregnation of an electrically active material via deformable pores.

The metal filaments 20MW may include a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof. According to some embodiments, the metal filaments 20MW may be formed of a metal identical to the metal constituting the conductive substrate 10. For example, in a current collector for an anode electrode, if the conductive substrate 10 is a copper foil, the metal filaments 20MW may be copper fibers. In a current collector for a cathode electrode, if the conductive substrate 10 is an aluminum foil, the metal filaments 20MW may be aluminum fibers.

According to another embodiment of the present invention, the metal filaments 20MW and the conductive substrate 10 may be formed of different metals. For example, in a current collector for an anode electrode, a metal included in the conductive substrate 10 may be copper, and the metal filaments 20MW may include a stainless steel. In the same regard, in a current collector for a cathode electrode, the conductive substrate 10 may include aluminum, and the metal filaments 20MW may include a stainless steel.

An average length of the metal filaments 20MW may be within a range from about 10 mm to about 150 mm, whereas an average thickness thereof may be within a range from about 0.1 μm to about 50 μm. If thickness of the metal filaments 20MW is less than 0.1 μm, it is difficult to form filaments having uniform material properties (e.g., uniform resistance or uniform strength) and to secure sufficient mechanical strength for restraining an impregnated electrically active material while being resistant to change of volume based on charging/discharging of a battery. In this case, as a battery is charged/discharged repeatedly, an electrically active material may be detached from metal filaments and electrically isolated in a conductive fiber layer. As a result, an irreversible capacity may increase, and thus life expectancy of the battery may be deteriorated.

If thickness of the metal filaments exceed 50 μm, surface area per volume of metal filaments decreases. As a result, it is difficult to improve battery charging/discharging efficiencies that are proportional to increase of surface areas and energy density decreases. Metal filaments having the above-stated dimensions may be obtained by being segmented from continuous metal fibers, and a non-woven fabric structure may be formed by using the same.

Preferably, metal filaments may have a thickness from about 2 μm to about 20 μm. When it is changed to a surface area to volume ratio per unit length (e.g., if a metal filament has a circular cross-section, 4/diameter), the surface area to volume ratio is from about $2\times10^5$ (1/m) to about $2\times10^6$ (1/m). Generally, a conventional current collector employing a metal foil has a thickness of about 20 μm. Metal filaments having thicknesses from about 2 μm to about 20 μm have a surface area that is from about four times to about forty times greater than that of the conventional current collector employing a foil having thickness of 20 μm. A surface area of a current collector refers to a surface area of a conductive network per volume of an electrode regarding the metal filaments 20MW forming reactive interfaces respectively against an electrically active material and an electrolyte. Therefore, a battery with significantly increased energy density may be obtained by maximizing the surface area of the current collector.

According to some embodiments, an average length of metal filaments may be from about 10 mm to about 150 mm. In this case, an average aspect ratio of the metal filaments is from about 200 to about $1.5\times10^6$. If necessary, the metal filaments may be segmented to have length from about 35 mm to about 120 mm and form a non-woven fabric structure.

According to another embodiment of the present invention, metal filaments constituting a conductive network may have one or mule of length or thickness different from one another. For example, together with metal filaments constituting the skeleton structure of the conductive fiber layer 20 (also referred to as long filaments; 20MW), auxiliary filaments (not shown) having from about 1% to about 50% lengths of the metal filaments 20MW may be dispersed in the conductive fiber layer 20. A ratio of length of a short filament to a long filament may be from about 1% to about 50%. The metal filaments 20MW constituting the skeleton structure determine overall conductivity and mechanical strength of the current collector 100, whereas the auxiliary filaments may determine internal resistance of a battery by improving electron transferring paths between an electrically active material and the long filaments or electrical connections between the long filaments. According to some embodiments, the short filaments may be provided in the conductive fiber layer 20 in the bare form and function as a conductive material.

According to some embodiments, a conductive material may be coated onto the metal filaments 20MW. The conductive material may be pre-coated onto the metal filaments 20MW before formation of the conductive fiber layer 20 or post-coated onto the metal filaments 20MW by using a suitable dispersing solvent in a follow-up operation thereafter. The conductive material may be carbon black, acetylene black, ketjen black, fine carbon like superfine graphite particles, a nano metal particle paste, an indium tin oxide (ITO) paste, carbon nanotubes, or other nano structures with large specific surface areas and low resistances. However, the present invention is not limited thereto. In an electrode employing the current collector 100, the conductive material prevents increase of internal resistance and lifespan deterioration of a battery that may occur when an electrically active material is peeled off from the metal filaments 20MW or physical contact between the metal filaments 20MW is weakened based on volume change caused by charging and discharging of the battery.

According to some embodiments, a binder may be pre-coated or post-coated on the metal filaments 20MW, together with the conductive material, to fix the conductive material on the metal filaments 20MW. The binder not only fixes the conductive material onto the metal filaments 20MW, but also fixes an electrically active material impregnated into the current collector 100 to the current collector 100. For example, the binder may be a polymer binder, such as polyvinylidenefluoride (PVdF), styrenebutadiene rubber (SBR), polyimide, a polyurethane-based polymer, a polyester-based polymer, and an ethylene-propylenediene copolymer (EPDM). Based on whether the current collector 100 is for a cathode electrode or an anode electrode, a polymer binder that is not dissolved by slurry solvent of the electrically active material may be selected and used.

For example, an organic solvent used in a follow-up operation for fabricating slurries may be selected to not to solve the binder. For example, a current collector having fixed thereto a conductive material via the binder may be obtained by forming a mixed solution, which is formed by solving carboxy methyl cellulose (CMC) to water and dispersing silver nano-particles thereto as a conductive material, and fabricating a conductive fiber layer by pre-coating the same onto metal filaments or post-coating the same onto fabricated conductive fiber layer. An electrode may be fabricated by impregnating common slurries for a cathode electrode, e.g., slurries formed by dispersing a cathode electrode active material to n-methyl-2-pyrrolydone (NMP) solvent. Since the CMC is not dissolved by the NMP, the binder is not eroded during impregnation of the slurries for a cathode electrode, and structure of a conductive fiber layer may be stably maintained. On the contrary, aqueous slurries may be used for an anode electrode, where an anode electrode may be fabricated by dissolving PVdF to the NMP, pre-coating or post-coating the solution onto metal filaments, and impregnating slurries of an aqueous anode electrode active material. Selectively, a solvent having a certain solubility with respect to the binder may be selected as a solvent for slurries to gelate the binder.

The linear hinders 20BW for improving mechanical strength of the conductive fiber layer 20 and fixing the conductive fiber layer 20 to the conductive substrate 10 may comprise a functional polymer material with suitable mechanical properties or a heat-resistance and being advantageous for fiberization, such as highly strong, highly elastic, and magnetic contractive fiber. For example, the linear binders 20BW may include polyethylene (PE), polypropylene (PP), polyethylene terephthalate (PET), polypropylene terephthalate (PPT), polyacrylonitryl (PAN), nylon, polyethylene naphthalatc (PEN), polyether sulfone (PES), polyether etherketone (PEEK), polyphenylene sulfide (PPS), polyvinyliden fluoride (PVDF), a copolymer thereof, a derivative thereof, or a mixture thereof. However, the above-stated materials are merely examples, and the present invention is not limited thereto.

The metal filament feature properties of metals, that is, excellent heat-resistance, plasticity, and electric conductivity compared to those of other materials and may be used in fabric manufacturing operations, such as a non-woven fabric processing operation. Therefore, such material advantages may be maintained throughout the metal filaments having lengths substantially equal to or greater than 5 mm, and thus, compared to other materials, such as carbon fibers and conductive polymer fibers, an operational burden for a bridging operation or a thermal operation may be relatively small and a manufacturing process window may be relatively wide.

Furthermore, an electrically active material may be easily loaded by impregnating the electrically active material into a conductive network via pores of the conductive network or coating the electrically active material onto the conductive fibers and an electrolyte may be easily introduced, an electrode may be easily formed. Furthermore, since flexibility may be obtained based on fibrous characteristics of the conductive fiber layer 20, the current collector 100 may be applied to battery packages having various designs, such as a cylindrical design, a hexahedral design, a linear design, or a free-deformable design.

In terms of fabricating, a non-woven fabric structure may be obtained by randomly mixing and bridging the linear binders 20BW and the metal filaments 20MW with each other. The bridging operation may be performed by using needle punching method, spun lacing method, stitch bonding method, or another suitable method. The needle punching method is a method of bridging the metal filaments 20MW with the linear binders 20BW by repeatedly and vertically inserting a large number of needles with hooks into a fiber layer including the metal filaments 20MW and the linear binders 20BW mixed with each other, where a velour type non-woven fabric may be fabricated by suitably designing shapes of the needles. The spun lacing method is a method of bridging the metal filaments 20MW with the linear binders 20BW by using high-velocity water jets instead of needles and is also referred to as a water-jet bridging method. The stitch bonding method is a method of sewing along layers of the metal filaments 20MW and the linear binders 20BW. The stitch bonding method may be performed after a conductive substrate is attached or may be performed with respect to layers in which the metal filaments 20MW are mixed with the linear binders 20BW only.

Figure 2A:
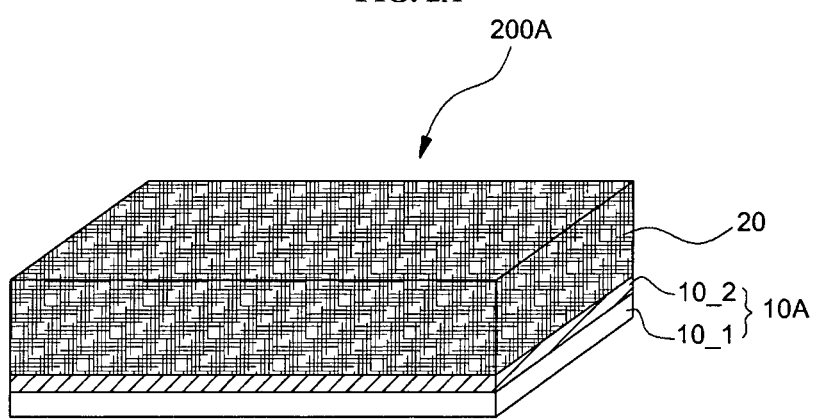
FIGS. 2A and 2B are perspective views of current collectors according to various embodiments of the present invention.
Figure 2B:
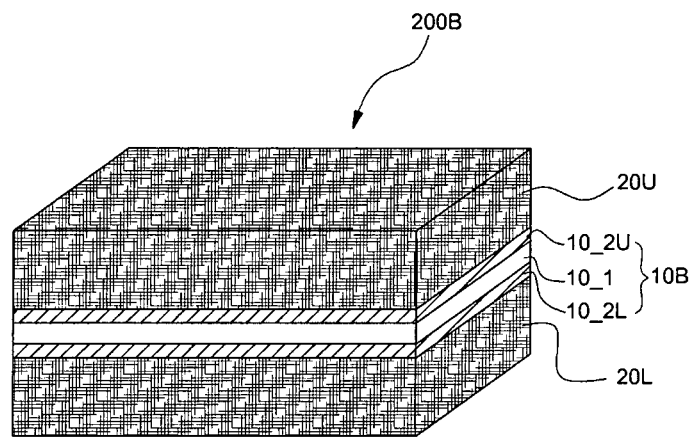

FIGS. 2A and 2B are perspective views of current collectors 200A and 200B according to various embodiments of the present invention. From among components shown in FIGS. 2A and 2B, components denoted by the same reference numerals as shown in previous drawings may be described by the descriptions given above with respect to the reference numerals unless otherwise clearly contradicted by context.

Referring to FIG. 2A, a conductive substrate 10A of the current collector 200A may be formed of a composite material. For example, a metal layer 10_2 to provide conductivity may be formed on an insulation film 10_1 as a thin film. The metal layer 10_2 may be formed via a sputtering method or an electrolyteless plating method. The insulation film 10_1 may be a flexible resin-based substrate. Since a resin-based substrate exhibits superior elasticity and mechanical strength than a metal-based substrate, the conductive substrate 10A may be thinner than the conductive substrate 10 formed of a metal foil as shown in FIG. 1A.

Referring to FIG. 2B, the current collector 200B may include a upper conductive fiber layer 20U and a lower conductive fiber layer 20L on both main surfaces of a conductive substrate 10B, respectively. The conductive substrate 10B may include an upper metal layer 10_2U and a lower metal layer 10_2L, which are formed as thin films, on both main surfaces of the insulation film 10_1. According to another embodiment of the present invention, the conductive substrate 10B may be the conductive substrate 10, such as a metal foil or a mesh as described above with reference to FIG. 1A.

Figure 3:
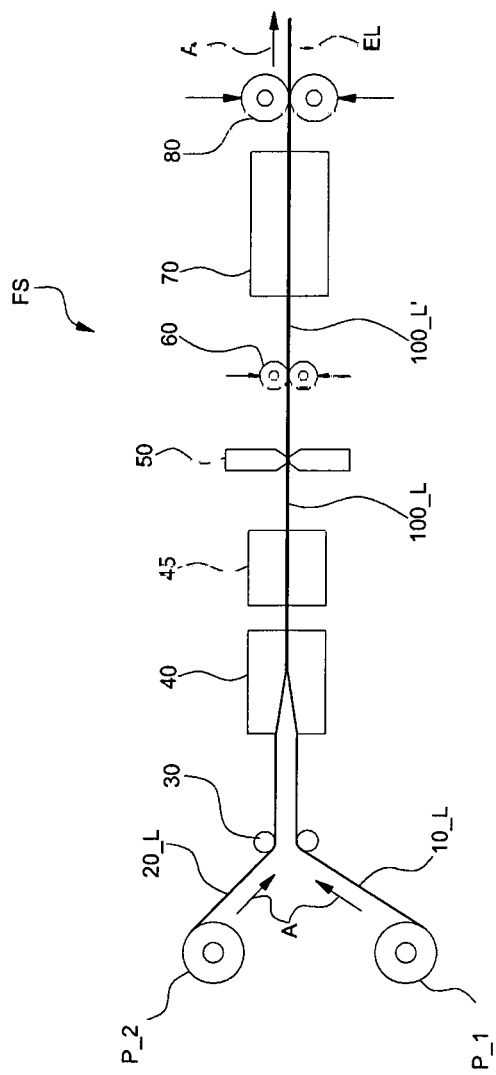
FIG. 3 is a diagram showing a current collector and an electrode fabricating system for fabricating an electrode, according to an embodiment of the present invention.

FIG. 3 is a diagram showing a current collector 100_L and an electrode fabricating system FS for fabricating an electrode EL, according to an embodiment of the present invention.

Referring to FIG. 3, since a conductive fiber layer is a combination of metal filaments having mechanical strength and polymer-based linear binders having elasticity, the conductive fiber layer may be resistant to tensile stresses that occur during continuous operations, and thus a current collector may be fabricated via continuous operations. To this end, a conductive substrate and a conductive fiber layer for forming a current collector may be wound in the form of sheets 10_L and 20_L and provided by unwinding devices P1 and P2, respectively.

Aligning members may be provided to align the conductive substrate sheet 10_L and the conductive fiber sheet 20_L that are unwound and provided from the unwinding devices P1 and P2 to be suitably stacked, where the aligning members may be roller members 30. According to another embodiment of the present invention, a guiding member, such as a blade, may be provided together with or replace the roller members 30.

The conductive substrate sheet 10_L and the conductive fiber sheet 20_L aligned in parallel to each other are combined with each other by a combining device 40. The combining device 40 may be a pressing device, such as a pressing roller for pressing the conductive fiber sheet 20_L and the conductive substrate sheet 10_L. Alternatively, the conductive fiber sheet 20_L and the conductive substrate sheet 10_L may be combined with each other in a fiber operation. In this case, the combining device 40 may be a needle punching device, a spun lacing device, or a stitch bonding device for combining the conductive substrate sheet 10_L and the conductive fiber sheet 20_L with each other.

According to some embodiments, the energy applying device 45 may replace or be provided with the combining device 40. The energy applying device 45 is a device for melting linear binders in the conductive fiber sheet 20_L and is a heater or a device for emitting an infrared ray, an ultraviolet ray, an electron beam, or ultrasound waves. Melted linear binders adhere the conductive fiber sheet 20_L to the conductive substrate sheet 10_L and improves mechanical strength by adhering metal filaments in the lower conductive fiber layer 20L to one another.

When the conductive fiber sheet 20_L is combined with the conductive substrate sheet 10_L, the current collector 100_L is completed. The current collector 100_L is diced to a certain size, and thus individual current collectors are fabricated. Selectively, a separate accommodating device (not shown), such as a winding roll, may be arranged to collect the continuously supplied current collector 100_L.

According to another embodiment of the present invention, as shown in FIG. 2, electrode fabricating operations may be continuously performed by using the fabricated current collector 100_L. For example, the fabricated current collector 100_L may experience an operation for charging an electrically active material, an operation for post-processing the electrically active material, and an operation for pressing an electrode. For example, the operation for charging the electrically active material may be an operation for loading the electrically active material in the form of slurries or powders. The electrically active material may be loaded by using a slit die 50.

The electrically active material is impregnated by a slit die 50 into a conductive fiber layer in the form of slurries or powders via pores exposed on a surface of the conductive fiber sheet 20_L of the current collector 100_L. An amount and uniformity of the impregnated electrically active material may be controlled by appropriately adjusting a pressure applied to the slit die 50. However, this is merely an example, and an electrically active material may be loaded by using a spraying device or by passing the current collector 100_L through a bath having dissolved or disperse therein the electrically active material. The electrically active material introduced via pores of the current collector 100_L may be trapped inside a conductive fiber layer. Alternatively, the conductive fiber layer may be depressed into an electrically active material layer, and thus a surface of the electrically active material layer and a surface of a conductive substrate may be mechanically bound to each other. Therefore, an operation using a solution bath may be performed, and adhesion between an electrically active material and a current collector may be improved.

According to some embodiments, to adjust an amount of an electrically active material to be impregnated, a guide roll 60 for applying a certain pressure may be provided. According to another embodiment of the present invention, an amount of an electrically active material to be impregnated may be controlled by sweeping a surface of the current collector sheet 100_L having loaded thereon the electrically active material.

According to another embodiment of the present invention, the electrically active material may be coated onto conductive fibers of the current collector sheet 100_L. To coat the electrically active material onto conductive fibers, a plating bath for electrolyte plating or electrolyteless plating may be provided. As the current collector sheet 100_L passes through an electrolyte or a metal ion solution in the plating bath, the electrically active material may be coated onto the conductive fibers, accompanied with reduction or extraction of metal ions. According to some embodiments, the electrically active material may be physically vapor-deposited onto the conductive fibers of the current collector sheet 100_L by using a sputtering method or an electron beam evaporation method or may be chemically vapor-deposited by using a suitable vapor precursor. To this end, a suitable atmospheric or vacuum chamber may be provided. The above-stated systems for forming the electrically active material may be used in combinations.

A current collector sheet 100_L' loaded with an electrically active material may be post-processed by being passed through a drying device or a heat treating device 70, such as a heater. Next, as indicated by the arrow, the post-processed current collector sheet 100_L' is pressed by a pressing device 80, such as a roller member capable of applying a pressure thereto, and thus an electrode sheet EL with controlled thickness and controlled electrode density may be obtained.

The fabricated electrode sheet EL may be continuously discharged by the fabrication system FS as indicated by the arrow A and may be accommodated by a winding device (not shown). The accommodated electrode sheet EL may be suitably cut and used for packaging batteries. According to some embodiments, the fabricated electrode sheet EL may continuously experience later operations, such as a tab forming operation, a separator stacking operation, an electrolyte impregnating operation, or a stacking operation for packaging, or a jelly roll forming operation.

Due to absence of fibrous characteristics and adhesion of metal filaments, a tensile elongation ratio may be 20% or higher due to stress applied to a metal filament sheet in continuous operations using the unwinding devices P1, P2, and so on. In this case, it is substantially impossible to continuously transfer the metal filament sheet by using rollers. Furthermore, an extreme defect, e.g., break, may occur. Even if such an extreme defect does not occur, if the metal filament is elongated, electric contacts between metal filaments and electric contact between surfaces of the metal filaments and an electrically active material may be deteriorated, and thus it is demanded to control and suppress an elongation ratio.

According to an embodiment of the present invention, since linear binders not only provide adhesion between metal filaments and a conductive substrate in a conductive fiber layer, but also provide resistance against tensile stresses, thereby controlling tensile elongation ratio of a current collector sheet to be less than or equal to 20% and to be preferably within a range from about 0.1% to about 10%. Therefore, continuous operations may be performed by using transferring devices, such as rollers, at a same level as the battery manufacturing operations using a metal foil current collector in the related art. Furthermore, since a conductive fiber layer including metal filaments is depressed into an electrically active material layer, and thus internal resistance of an electrode may be reduced.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A current collector comprising:
a conductive substrate; and
a conductive fiber layer, which is disposed on the conductive substrate, the conductive fiber layer comprising:
a non-woven fabric structure comprising a skeleton structure, the skeleton structure being a three-dimensional porous fiber structure with first metal filaments and line-type binders bridged with each other by a needle punching method, a spun lacing method, or a stitch bonding method so that the first metal filaments and the line-type binders are randomly entangled with each other to reinforce a mechanical strength of the conductive fiber layer,
wherein the line-type binders are partially melted so that the conductive fiber layer is combined with the conductive substrate via the line-type binders,
wherein an average length of the first metal filaments is within a range from about 10 mm to about 150 mm,
wherein the line-type binders comprise a polymer material with mechanical properties or heat-resistance, the polymer material includes polyethylene (PE), polypropylene (PP), po-lyethylene terephthalate (PET), polypropylene terephthalate (PPT), polyacrylonitryl (PAN), ny-lon, polyethylene naphthalate (PEN), polyether sulfone (PES), polyether etherketone (PEEK), polyphenylene sulfide (PPS), polyvinyliden fluoride (PVDF), a copolymer thereof, a derivative thereof, or a mixture thereof,
wherein the conductive substrate comprises a metal foil or a metal mesh, at least some of the first metal filaments directly contact the metal foil or the metal mesh, and the metal foil or the metal mesh is directly bonded to the conductive fiber layer by at least some of the line-type binders without a separate bonding layer therebetween,
wherein the current collector further comprises auxiliary metal filaments in the conductive fiber layer, and the auxiliary metal filaments have lengths in a range of from about 1% to about 50% lengths of the first metal filaments, and
wherein the first metal filaments constitute the skeleton structure and determine overall conductivity and a mechanical strength of the current collector, and the auxiliary metal filaments provide electrical connections at least between the first metal filaments.

2. The current collector of claim 1, wherein an average thickness of the first metal filaments is within a range from about 0.1 µm to about 50 µm.

3. The current collector of claim 1, wherein the first metal filaments comprise a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof.

4. The current collector of claim 1, wherein a conductive material is coated on to the first metal filaments.

5. The current collector of claim 1, wherein the current collector is for a lithium secondary battery.

6. The current collector of claim 1, wherein a tensile elongation ratio of the current collector is controlled within a range from 0.1% to 10%.

7. An electrode comprising:
a current collector comprising:
a conductive substrate; and
a conductive fiber layer, which is disposed on the conductive substrate, the conductive fiber layer comprising:
a non-woven fabric structure comprising a skeleton structure, the skeleton structure being a three-dimensional porous fiber structure with first metal filaments and line-type binders bridged with each other by a needle punching method, a spun lacing method, or a stitch bonding method so that the first metal filaments and the line-type binders are randomly entangled with each other to reinforce a mechanical strength of the conductive fiber layer; and an electrically active material impregnated into the conductive fiber layer, wherein the line-type binders are partially melted so that the conductive fiber layer is combined with the conductive substrate via the line-type binders,
wherein an average length of the first metal filaments is within a range from about 10 mm to about 150 mm,
wherein the line-type binders comprises a polymer material with mechanical properties or heat-resistance, the polymer material includes polyethylene (PE), polypropylene (PP), polyethylene terephthalate (PET), polypropylene terephthalate (PPT), polyacrylonitryl (PAN), nylon, polyethylene naphthalate (PEN), polyether sulfone (PES), polyether etherketone (PEEK), polyphenylene sulfide (PPS), polyvinyliden fluoride (PVDF), a copolymer thereof, a derivative thereof, or a mixture thereof,
wherein the conductive substrate comprises a metal foil or a metal mesh, at least some of the first metal filaments directly contact the metal foil or the metal mesh, and the metal foil or the metal mesh is directly bonded to the conductive fiber layer by at least some of the line-type binders without a separate bonding layer therebetween,
wherein the current collector further comprises auxiliary metal filaments in the conductive fiber layer, and the auxiliary metal filaments have lengths in a range of from about 1% to about 50% lengths of the first metal filaments, and
wherein the first metal filaments constitute the skeleton structure and determine overall conductivity and a mechanical strength of the current collector, and the auxiliary metal filaments provide electrical connections at least between the first metal filaments.

8. The electrode of claim 7, wherein an average thickness of the first metal filaments is within a range from about 0.1 µm to about 50 µm.

9. The electrode of claim 7, wherein the first metal filaments comprise a stainless steel, aluminum, nickel, copper, titanium, platinum, gold, silver, ruthenium, tantalum, niobium, hafnium, zirconium, vanadium, indium, cobalt, tungsten, tin, beryllium, molybdenum, an alloy thereof, or a stacked structure thereof.

10. The electrode of claim 7, wherein a conductive material is coated on to the first metal filaments.

11. The electrode of claim 7, wherein the current collector is for a lithium secondary battery.

* * * * *